Figure 1:
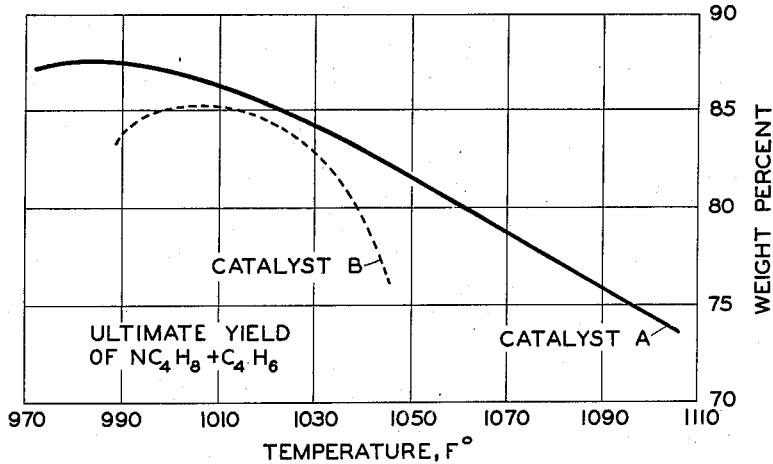

May 12, 1953

E. W. PITZER 2,638,455

ALUMINA-METAL OXIDE DEHYDROGENATION
CATALYST AND ITS PREPARATION

Filed June 14, 1948

2 Sheets-Sheet 1

INVENTOR.
E.W. PITZER
BY Hudson & Young
ATTORNEYS

May 12, 1953

E. W. PITZER 2,638,455

ALUMINA-METAL OXIDE DEHYDROGENATION
CATALYST AND ITS PREPARATION

Filed June 14, 1948

2 Sheets-Sheet 2

INVENTOR.
E. W. PITZER
BY *Hudson & Young*
ATTORNEYS

Patented May 12, 1953

2,638,455

UNITED STATES PATENT OFFICE 2,638,455

ALUMINA-METAL OXIDE DEHYDROGENATION CATALYST AND ITS PREPARATION

Emory W. Pitzer, Bartlesville, Okla., assignor to Phillips Petroleum Company, a corporation of Delaware Application June 14, 1948, Serial No. 32,834

19 Claims. (Cl. 252—465)

This invention pertains to a process for the manufacture of hydrocarbon conversion catalysts and to the catalysts made by the process. The invention also relates to hydrocarbon conversion processes which involve the changing of the carbon-to-hydrogen ratio of the hydrocarbons. A specific aspect of the invention is concerned with the dehydrogenation of $C_2$-$C_{10}$ hydrocarbons.

Various hydrocarbons, particularly those containing at least two and not more than ten carbon atoms per molecule, must frequently be dehydrogenated to produce more unsaturated materials suitable for various purposes in the chemical and petroleum industries. Such reactions include dehydrogenation of butane to produce butylenes, dehydrogenation of butylenes to produce butadiene, dehydrogenation of other paraffins to produce the corresponding olefins, dehydrogenation of olefins to produce the corresponding diolefins, dehydrogenation of naphthenes to produce aromatics, and dehydrocyclization of aliphatic hydrocarbons to produce aromatic hydrocarbons. Conversely, it is frequently desirable to effect hydrogenation of unsaturated material to produce more saturated products, for example, hydrogenation of aromatic hydrocarbons to produce cyclo-aliphatic hydrocarbons, and hydrogenation of petroleum fractions containing olefinic materials to effect saturation thereof.

The catalyst of the invention encompasses composite metal oxide catalysts of chromia-alumina and chromia-beryllia-alumina and similar composites. At the present time, catalysts comprising alumina in combination with at least one of the oxides of metals of the left-hand column of group 6 such as Cr, Mo, W, and U, and V of group 5 of the periodic table, together with a promoter such as beryllium oxide, are recognized as the best composite catalysts for catalytic dehydrogenation of hydrocarbons such as n-butane. For example, a particularly effective catalytic composition for dehydrogenating paraffin hydrocarbons is found in a three-component catalyst consisting of about 50% alumina, 40% chromia, and 10% beryllia. Other proportions of these constituents are also effective in hydrocarbon dehydrogenation processes. A conventional method of preparing such composites is the impregnation of a substantially dehydrated alumina pellet with salt solutions of the other metals followed by the conversion of the metal salts to the metal oxides. Sometimes finely divided aluminum oxide is first impregnated with the metal salts followed by decomposition and conversion to the metal oxides and is thereafter pelleted into finely divided composites. The most effective dehydrogenation catalyst up to this time have been made by co-precipitating the metal oxides from solutions of their salts so as to obtain a composite gel consisting of the metal oxides in intimate contact in a homogeneous gel. Various other methods of preparing dehydrogenation catalysts have been devised, none of which produce catalysts superior to the co-precipitated gel catalysts just referred to. While the co-precipitated gel catalysts are superior dehydrogenation catalysts, they are comparatively expensive because of the complicated and time-consuming methods required in their preparation.

The present invention encompasses the use of the catalysts described herein in processes for adding hydrogen to, or taking hydrogen from, hydrocarbons. They are particularly effective in dehydrogenating normal butane to normal butenes, cyclo-hexane to benzene, ethyl benzene to styrene, and analogous reactions involving homologs of these materials. These catalysts may be used to advantage in the dehydrogenation of any dehydrogenatable hydrocarbon, under conditions of temperature, pressure, and reaction time within conventional ranges such as 900 to 1300° F., up to 500 p. s. i. g., and 0.5 to 5 liquid volumes of charge per volume of catalyst per hour, and are especially advantageous when treating hydrocarbons having at least two and not more than 10 carbon atoms per molecule.

It is a principal object of the present invention to provide a comparatively simple and economical method of manufacturing a highly efficient dehydrogenation catalyst which has unusually long life, a high total conversion, and low coke formation. It is also an object of the invention to provide improved dehydrogenation catalysts. A further object of the invention is to provide an improved process for dehydrogenating hydrocarbons, particularly paraffin hydrocarbons, including the dehydrogenation of n-butane to butylenes and butadiene. Other objects of the invention will become apparent from a consideration of the accompanying disclosure.

A novel method of producing metal oxide composites which are superior dehydrogenation catalysts to co-precipitated gel composites of the same metal oxide concentration has been found. This method comprises digesting a mixture of the oxides selected for the composition with nitric acid for an extended period of time, followed by heating the digested mixture until it is dry and hard and converting any nitrates formed to oxides, thereafter comminuting the digested and dried mixture, forming a mixture with water or with Sterotex (hydrogenated corn oil) or other suitable binder, and forming the mixture into pellets by any conventional method of pelleting. If desired, the catalyst composite can be utilized in finely divided form after the comminuting step, for example, in the fluidized catalyst technique. It is preferred to form a homogeneous mixture of the oxides in finely divided form before digesting in nitric acid. A suitable method is to grind the oxides in any type of grinding equipment until the material passes a 100-mesh screen, and preferably a 325-mesh screen. Sufficient nitric acid of 20 to 70% concentration should be added so as to at least thoroughly wet the mixed oxides. Usually about two or three times the weight of the mixed oxides is suitable but acid weight between ½ and 5 times the weight of the mixed oxides will produce superior catalysts. The digestion may be carried on under total reflux, or acid may be added periodically in order to maintain a suitable amount of acid in the digestion mixture. The latter procedure is more desirable in that it produces more active catalysts when using the lower oxides of the group 6 or group 5 metal as the initial catalyst constituent. The digestion with nitric acid should be continued for a period of at least 1 or 2 hours, usually 40 to 60 hours, and sometimes 100 hours or more.

It has been found that the addition of $NH_4NO_3$ in an amount between 1 and 3 times the weight of the finished catalyst improves the activity of the catalyst in all cases, and more particularly so when the starting material is a lower oxide of one or more metals of the left-hand column of group 6 and of vanadium. The ammonium nitrate can be added at any time during the digestion period, but it is preferable to incorporate it at an early stage in the digestion or in the mixed oxides before the digestion is initiated.

In the preparation of an alumina-chromia composite by the method of the invention, suitable dehydrogenation catalysts can be prepared with any reasonable proportions of these constituents, but an amount of chromium oxide in the range of 10 to 70% by weight of the final composite is preferred in that such composites are more effective in dehydrogenation reactions. However, even in compositions outside of the preferred range, the method of the invention produces catalysts which are more active than catalysts of similar concentration of chromium and aluminum oxides made by other known methods. When using other group 6 metal oxides and/or vanadium in the composite, similar proportions are preferred. The addition of certain stabilizers or promoters to the composite catalysts may be made with effective results. A conventional composite comprises the oxides of aluminum, chromium, and beryllium. Sometimes magnesium is substituted for beryllium with similarly improved results. When including beryllium oxide in the composite, it may be included in an amount between 1 and 15% by weight of the finished catalyst, preferably 5 to 10% by weight. When incorporating magnesium oxide in the catalyst composite, similar amounts may be used. It is contemplated that the balance of the catalyst is aluminum oxide. Hence, the alumina taken with the group 6 metal oxides and/or vanadium in the composite catalyst make up at least 85 weight per cent of the catalyst composite. While the catalyst has thus far been described as including only one metal oxide from groups 5 and 6 as enumerated hereinabove, the inclusion of more than one of these metal oxides in an amount between 10 and 70% by weight of the finished catalyst is within the scope of the invention.

The following examples showing the above method of manufacturing dehydrogenation catalysts of specific compositions and dehydrogenation processes in the presence of these catalysts are set forth in order to provide a clearer understanding of the invention. Certain obvious modifications of the procedures set forth may be made without departing from the scope and spirit of the invention. The proportions of catalyst components in the following examples and elsewhere herein are given in parts by weight, or alternatively in weight per cent.

EXAMPLE I

Catalyst A $40Cr_2O_3$–$10BeO$–$50Al_2O_3$ (*mixed oxides digested in nitric acid*).—Chromium trioxide, beryllium oxide, and aluminum oxide are stirred and boiled for 46 hours under total reflux with 70 per cent nitric acid equivalent to about three times the weight of the oxides. After digestion, the mixture is heated to 780° F. in 30 minutes and kept at that temperature for 15 hours. The heated material, which is dark brown and has an apparent density of about 0.2 gram per cc., is mixed with 10 per cent water and 5 per cent Sterotex, ground in a hammer mill to pass a 100-mesh sieve, and pilled. Sterotex is removed from the pills by beating them in a stream of air to 1000° F. in 3 hours and keeping them at that temperature for 21 hours.

EXAMPLE II

Catalyst B $40Cr_2O_3$–$10BeO$–$50Al_2O_3$ (*coprecipitated*).—Hydrated chromium, beryllium, and aluminum nitrates (947, 369, and 1656 grams, respectively) are dissolved and diluted with distilled water to about 0.27-molar concentration in a glass container. Concentrated ammonium hydroxide (57 per cent) is added slowly with vigorous stirring so that the metal hydroxides precipitate and the pH of the mixture is 7.4 in about 2.75 hours. The mixture is filtered immediately in Buchner funnels and the filter-cake is dried for 52.5 hours at about 200° F. Ammonium nitrate is decomposed and the metal hydroxides are converted to oxides by heating the dry residue to 750° F. in a round-bottom flask in 30 minutes and maintaining at that temperature for 24 hours. The heated residue is exposed to air for 24 hours and absorbs 12.5 per cent moisture. It was mixed with 5 per cent Sterotex, ground to pass a 100-mesh sieve, pilled, and calcined.

EXAMPLE III

Catalyst C $40Cr_2O_3$–$10BeO$–$50Al_2O_3$ (*mechanically mixed oxides*).—Chromic oxide, beryllium oxide, and aluminum oxide are mixed for 5 minutes in a Waring Blendor, mixed with 5 per cent Sterotex for an additional 2 minutes, made into pills, heated in a stream of air to 1000° F. in 3 hours, and kept at that temperature for 21 hours to remove Sterotex.

EXAMPLE IV

Catalyst D $40Cr_2O_3$–$10BeO$–$50Al_2O_3$ (*mixed oxides digested in water*).—Chromic oxide, beryllium oxide, and aluminum oxide are stirred and boiled for 62 hours under total reflux with water equivalent to about twice the weight of the oxides. After digestion the mixture is heated to 750° F. in 3 hours and kept at that temperature for 44 hours. The heated material, which is green, is mixed with 5 per cent Sterotex, ground in a hammer mill to pass a 100-mesh screen, and pilled. Sterotex is removed from the pills by heating them in a stream of air to 1000° F. in 3 hours and keeping them at that temperature for 19 hours.

EXAMPLE V

CATALYST E $40Cr_2O_3$–$10BeO$–$50Al_2O_3$ (*mixed oxides digested in acetic acid*).—Chromium trioxide, beryllium oxide, and aluminum oxide are stirred and boiled for 45 hours under total reflux with glacial acetic acid equivalent to about twice the weight of the oxides. After digestion the mixture is heated to 750° F. in 8 hours and kept at that temperature for 48 hours. The heated material, which is dark brown, is mixed with 10 per cent Sterotex, ground in a hammer mill to pass a 100-mesh sieve, and pilled. Sterotex is removed from the pills by heating them in a stream of air to 1000° F. in 3 hours and keeping them at that temperature for 21 hours. Crushing strength of the pills before and after Sterotex removal is 4.2 and 6.2 pounds, respectively.

EXAMPLE VI

CATALYST F $40Cr_2O_3$–$10BeO$–$50Al_2O_3$ (*mixed oxides digested in nitric acid*).—Chromic oxide, beryllium oxide, and aluminum oxide are boiled with 70 per cent nitric acid equivalent to about three times the weight of the oxides for 43 hours, during which the liquid level is kept constant by periodic addition of fresh acid. After digestion the mixture is heated to 780° F. in 4.5 hours and kept at that temperature for 24 hours. The top layer of the calcined material is a black mass and the bottom layer, which is used for this catalyst, is a greenish-brown, finely divided powder. The powder is mixed with 2 per cent water and 5 per cent Sterotex, ground in a hammer mill to pass a 100-mesh sieve, and pilled. Sterotex is removed from the pills by heating them in a stream of air to 1000° F. in 3 hours and keeping them at that temperature for 21 hours.

EXAMPLE VII

CATALYST G $40Cr_2O_3$–$10BeO$–$50Al_2O_3$ (*mixed oxides digested in nitric acid*).—Chromic oxide, beryllium oxide, and aluminum oxide are stirred and boiled for 47 hours under total reflux with 70 per cent nitric acid equivalent to about three times the weight of the oxides. After digestion the mixture is heated to 750° F. in 36 hours and kept at that temperature for 36 hours. The heated material, which is green and has a low apparent density, is mixed with 10 per cent water and 5 per cent Sterotex, ground in a hammer mill to pass a 100-mesh sieve, and pilled. Sterotex is removed from the pills by heating them in a stream of air to 1000° F. in 6 hours and keeping them at that temperature for 8 hours. Crushing strength of the pills before and after Sterotex removal is 6.4 and 11.6 pounds, respectively.

EXAMPLE VIII

CATALYST H $40Cr_2O_3$–$10BeO$–$50Al_2O_3$ (*mixed oxides digested in nitric acid plus ammonium nitrate*).—Chromic oxide, beryllium oxide, and aluminum oxide are stirred and boiled for 44 hours under total reflux with ammonium nitrate equivalent to about twice the weight of the oxides and 70 per cent nitric acid equivalent to about three times the weight of the oxides. After digestion the mixture is heated to 800° F. in 24 hours, kept at that temperature for 128 hours, and heated at 550° F. for 36 hours. The heated material, which is dark brown, is mixed with 10 per cent water and 10 per cent Sterotex, ground in a hammer mill to pass a 100-mesh sieve, and pilled. Sterotex is removed from the pills by heating them in a stream of air to 1000° F. in 3 hours and keeping them at that temperature for 21 hours.

Catalyst B is selected from a large number of co-precipitated gel type catalysts of this composition made by varying techniques and represents the best catalyst of this type available at the present time. Similarly, Catalyst A represents the best acid digested catalyst made according to the present invention. The various catalysts, except Catalyst B, of the examples are compared by effecting the dehydrogenation of a technical grade n-butane stream in the presence of each of the catalysts under substantially identical operating conditions and different temperatures ranging from 1000° to 1100° F. at a space velocity of 750 v./v./hr. and at atmospheric pressure. Alternate dehydrogenation and regeneration periods of 60 and 56 minutes, respectively, are used. The following table gives the per pass yield of N—$C_4H_8$ and $C_4H_6$ in weight per cent as obtained in the tests.

TABLE I

| Catalyst | Temperatures, °F. | | | | | |
|---|---|---|---|---|---|---|
| | 1,000 | 1,020 | 1,040 | 1,060 | 1,080 | 1,100 |
| A | 41.5 | 44.0 | 45.9 | 47.0 | 46.5 | 44.5 |
| C | | | 30.0 | 33.0 | 33.8 | 31.8 |
| D | 27.0 | 29.2 | 31.2 | 32.7 | 33.6 | 33.3 |
| E | | | 35.0 | 38.2 | | |
| F | 34.8 | 39.4 | 42.7 | 44.2 | 43.1 | 40.6 |
| G | 20.5 | 27.8 | 35.0 | 38.7 | 39.3 | 36.0 |
| H | 37.5 | 41.1 | 43.8 | 44.8 | 41.9 | |

The data in the following table show a comparison between the activity and the life of Catalysts A and B obtained by dehydrogenating n-butane at atmospheric pressure, a temperature of 1030° F., butane and regeneration gas space velocities of 750 and 3,000 v./v./hr. (STP), respectively, and dehydrogenation and regeneration periods of one hour each. The percentage of 8-day activity after 44 days' use is also shown.

TABLE II

| Catalyst | Per Pass Yield of N—$C_4H_8$+$C_4H_6$, Weight Percent | | | Percentage of 8-day activity after 44-days use |
|---|---|---|---|---|
| | 0 days | 8 days | 44 days | |
| A | 44.0 | 37.0 | 36.2 | 97.8 |
| B | 40.0 | 38.3 | 31.7 | 82.8 |

Figure 2:
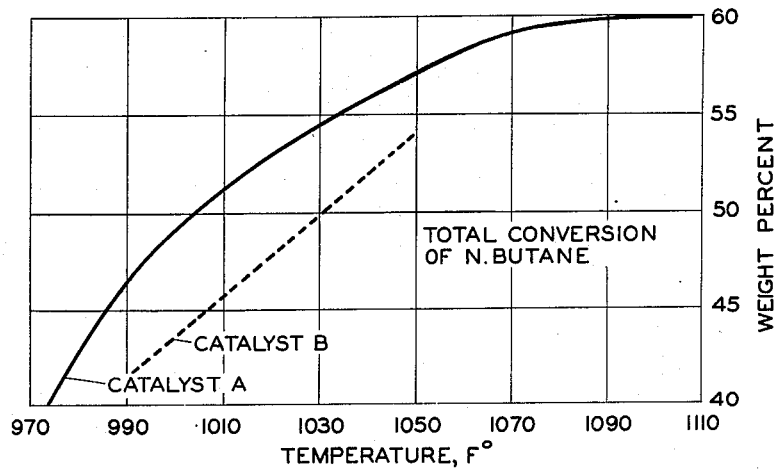
Figure 3:
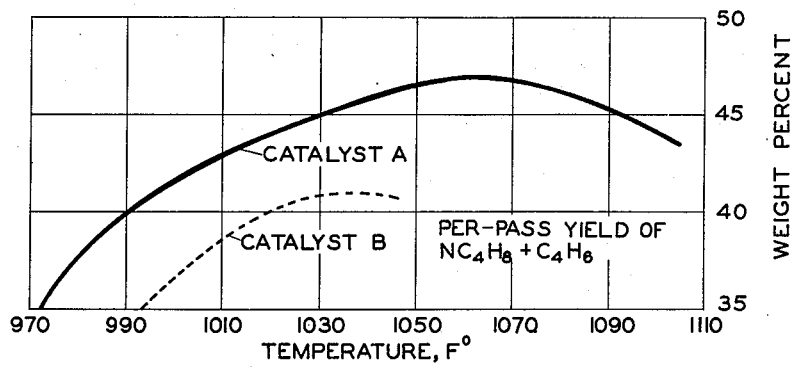
Figure 4:
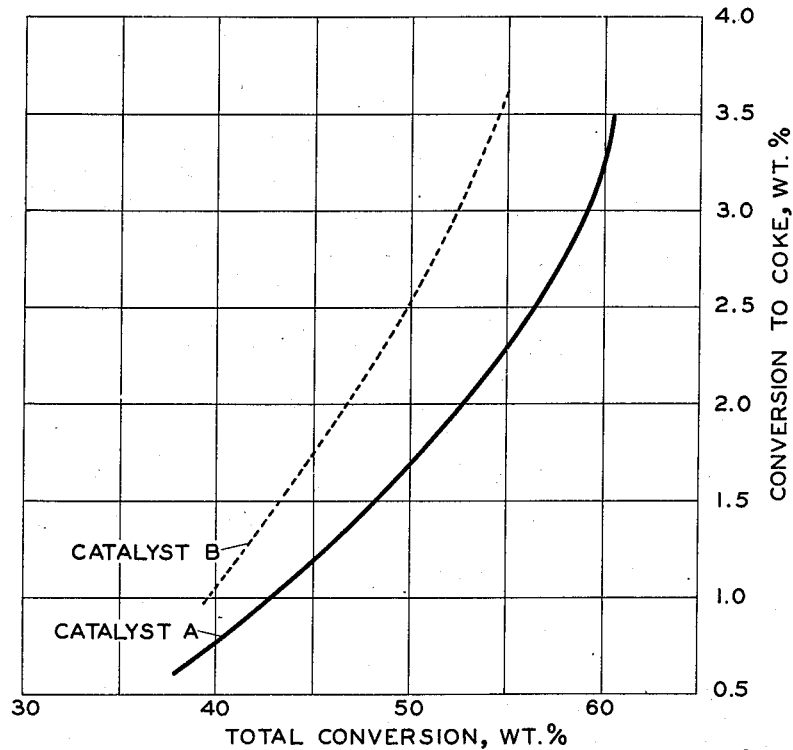

Figure 1 of the drawings shows a comparison between the ultimate yield of N—$C_4H_8$+$C_4H_6$ effected by Catalysts A and B in the dehydrogenation of n-butane at various temperatures using a butane space velocity of 750 v./v./hr. at atmospheric pressure. Figure 2 shows the total conversion effected by Catalysts A and B under the same operating conditions as used in obtaining the data in Figure 1. Similarly, Figure 3 shows the per pass yield of N—C₄H₈+C₄H₆ effected with Catalysts A and B. Figure 4 shows the weight per cent of conversion to coke in proportion to the total conversion in weight per cent effected by Catalysts A and B under the same operating conditions as Figure 1.

It is clear from the data of Table I that Catalyst A made by the process of the invention is a superior catalyst to Catalysts C, D, and E. Catalysts C and D are substantially equal in activity, the former consisting of a simple pelleted mixture of the oxides while the latter consists of a comparable mixture digested with water prior to pelleting. Apparently, digesting the mixed oxides with water has little effect on the activity of the resulting catalyst. Digesting the mixed oxides with acetic acid (Catalyst E) effects some improvement in catalyst activity but does not enhance catalyst activity comparably to nitric acid digestion.

A comparison of the activity of Catalyst F with that of Catalyst G (both catalysts having been made by digesting the mixed oxides, including Cr₂O₃, with HNO₃) indicates that the addition of fresh acid to the mixture during digestion is an improvement over digesting under total reflux when utilizing the sesqui-oxide as the chromium oxide starting material.

The data for Catalyst H, prepared in the same manner as Catalyst G, except for the addition of NH₄NO₃ to the digestion mixture, shows the improved activity effected by NH₄NO₃ treatment during digestion. An improvement is also effected when digesting the oxides in the presence of NH₄NO₃ where the starting chromium oxide is the trioxide but the improvement is less marked.

The experimental data presented in Table II clearly show the superiority of Catalyst A over Catalyst B in initial activity and in continued high activity over a substantial period of time (catalyst life).

When digesting the mixed oxides containing Cr₂O₃ as the source of chromia, the digestion with nitric acid must proceed at least 10 hours before the characteristic reddish brown color of hexavalent chromium appears and further improvement in the catalyst is effected by extending the digestion period. When starting the digestion with CrO₃ as the source of chromia, improvement of the catalyst obtains from as little as one hour of digestion but greater improvement is effected by increasing the digestion period. The following table shows the yield of N—C₄H₈+C₄H₆ in weight per cent of the butane feed, when dehydrogenating n-butane at 1060° F., atmospheric pressure, and a space velocity of 750 v./v./hr. (STP) in contact with mixed oxides catalysts consisting of 40Cr₂O₃–10BeO–50Al₂O₃ prepared by digesting with HNO₃ for varying periods, using CrO₃ as the source of chromium oxide.

TABLE III

*Length of digestion period—Yield relationship*

| Digestion Period, hrs. | 0 | 1 | 2 | 10 | 30 | 50 |
|---|---|---|---|---|---|---|
| Yield, Weight percent | 33.0 | 36.5 | 37.7 | 39.1 | 43.9 | 49.6 |

The foregoing examples, when taken in conjunction with the tables and drawing, illustrate the superior type catalyst of the invention and its process of manufacture. It should be understood that any theories involved or set forth do not in any way limit the invention and that the examples and accompanying data are given by way of illustration of the various advantages of the present invention and are not to be construed as undue limitations thereof. Variations of the invention may be practiced in the light of the disclosure without departing from the spirit or scope of the invention.

I claim:

1. A process for manufacturing a composite catalyst consisting essentially of the oxides of aluminum and at least one of the metals selected from the group consisting of Cr, Mo, W, U, and V, which comprises digesting a mixture of said oxides with nitric acid; heating the digested mixture so as to completely dry the same and decompose any nitrates therein; and forming the resulting oxide composite into suitable particles for contacting operations.

2. The process of claim 1 in which the forming step comprises finely comminuting the nitrate-free, dried oxide mixture; forming a mixture of the resulting fines; and compacting said mixture into particles suitable for contacting operations.

3. A process for manufacturing a composite catalyst consisting essentially of the oxides of Al and Be and at least one oxide selected from the group consisting of the oxides of Cr, Mo, W, U, and V, which comprises digesting a mixture of said oxides with nitric acid; heating the digested mixture so as to completely dry the same and decompose any nitrates therein; and forming the resulting oxide composite into suitable particles for contacting operations.

4. The process of claim 3 in which the forming step comprises finely comminuting and thereafter pelleting the composite.

5. A process for manufacturing a composite oxide catalyst which comprises digesting with nitric acid a mixture of the oxides of Al, Cr, and Be in comminuted form, the beryllium oxide constituting from 1 to 15 weight per cent of the composite catalyst; thereafter heating the digested mixture so as to completely dry the same and decompose any nitrates therein; and forming the resulting oxide composite into suitable particles for contacting operations.

6. A process for manufacturing a composite oxide catalyst which comprises preparing a mixture of Al₂O₃, Cr₂O₃, and BeO in comminuted form wherein the Cr₂O₃ amounts to between 10 and 70 per cent by weight, the BeO between 1 and 15 per cent by weight of the mixture, and Al₂O₃ comprises the balance; digesting said mixture with HNO₃ in amount between 0.5 and 5 times the weight of said mixture for a period of at least 10 hours; heating the digested mixture so as to dry and harden the same and decompose any nitrates therein; and comminuting the hardened oxide composite.

7. The process of claim 6 wherein fresh HNO₃ is periodically added to the digestion mixture so as to maintain a relatively constant liquid level therein.

8. The process of claim 6 in which the digestion of the initial mixture is effected in the presence of NH₄NO₃ in an amount between 0.1 and 3 times the weight of the finished catalyst.

9. A process for manufacturing a composite oxide catalyst which comprises preparing a mixture of Al₂O₃, CrO₃, and BeO in comminuted form wherein the CrO₃ amounts to between 10 and 70 per cent by weight, the BeO to between 1 and 15 per cent by weight, of the mixture, and the Al₂O₃ comprises the balance; digesting said mixture with HNO₃ in amount between 0.5 and 5 times the weight of said mixture for a period of at least 1 hour; heating the digested mixture so as to dry and harden the same and decompose any nitrates therein; and comminuting the hardened oxide composite.

10. The process of claim 9 wherein the hardened oxide composite is comminuted to pass a 100-mesh screen, formed into a mixture, and pelleted.

11. A process for manufacturing a composite catalyst which comprises digesting a mixture of the oxides of Al and Cr with nitric acid; heating the digested mixture so as to completely dry the same and decompose any nitrates therein; and forming the resulting oxide composite into suitable particles for contacting operations.

12. A process for manufacturing a composite oxide catalyst which comprises preparing a mixture of $Al_2O_3$ and $Cr_2O_3$ in comminuted form; digesting said mixture with nitric acid for at least 10 hours; heating the digested mixture so as to dry and harden the same and decompose any nitrates therein; and comminuting the hardened oxide composite.

13. A process for manufacturing a composite oxide catalyst which comprises preparing a mixture of $Al_2O_3$ and $CrO_3$ in comminuted form; digesting said mixture with nitric acid for at least 1 hour; heating the digested mixture so as to dry and harden the same and decompose any nitrates therein; and comminuting the hardened oxide composite.

14. A process for manufacturing a composite oxide catalyst which comprises preparing a mixture of $Al_2O_3$ and $Cr_2O_3$ in comminuted form wherein the $Cr_2O_3$ amounts to between 10 and 70 per cent by weight of the mixture; digesting said mixture in nitric acid in an amount between 0.5 and 5 times the weight of said mixture in the presence of added $NH_4NO_3$ in an amount between 0.1 and 3 times the weight of the finished catalyst; heating the digested mixture so as to dry and harden the same and decompose any nitrates therein; and comminuting the hardened oxide composite.

15. A process for manufacturing a composite metal oxide catalyst which comprises digesting with nitric acid a mixture of the oxides of aluminum and at least one of the metals selected from the group consisting of Cr, Mo, W, U, and V in comminuted form; thereafter heating the digested mixture so as to completely dry the same and decompose any nitrates therein; and forming the resulting oxide composite into suitable particles for contacting operations.

16. A catalyst manufactured by the process of claim 1, consisting essentially of between 10 and 70 per cent by weight of at least one oxide from the group consisting of Cr, Mo, W, U, and V oxides and the balance aluminum oxide.

17. A catalyst manufactured by the process of claim 3 and consisting essentially of between 10 and 70 per cent by weight of at least one oxide selected from the group consisting of the oxides of Cr, Mo, W, U, and V, between 1 and 15 per cent beryllium oxide, and the balance aluminum oxide.

18. The catalyst of claim 16 consisting essentially of between 10 and 70 per cent by weight chromium oxide and the balance aluminum oxide.

19. The catalyst of claim 17 containing $Cr_2O_3$ in crystalline form.

EMORY W. PITZER.

References Cited in the file of this patent

UNITED STATES PATENTS

| Number | Name | Date |
|---|---|---|
| Re. 21,911 | Frey et al. | Sept. 30, 1941 |
| 1,678,078 | Ramage | July 24, 1928 |
| 1,881,692 | Krauch et al. | Oct. 11, 1932 |
| 2,403,671 | Matuszak | July 9, 1946 |
| 2,411,829 | Huffman | Nov. 26, 1946 |
| 2,429,361 | Linn et al. | Oct. 21, 1947 |
| 2,438,569 | Mattox | Mar. 30, 1948 |
| 2,483,929 | Owen | Oct. 4, 1949 |

FOREIGN PATENTS

| Number | Country | Date |
|---|---|---|
| 313,426 | Great Britain | June 10, 1929 |